United States Patent [19]

Yanagihara

[11] Patent Number: 5,743,243
[45] Date of Patent: Apr. 28, 1998

[54] COMPRESSION-IGNITION TYPE ENGINE

[75] Inventor: Hiromichi Yanagihara, Gotemba, Japan

[73] Assignee: Toyota Jidosha Kubushiki Kaisha, Aichi-ken, Japan

[21] Appl. No.: 837,745

[22] Filed: Apr. 22, 1997

[30] Foreign Application Priority Data

Apr. 23, 1996 [JP] Japan ................................. 8-101672
Apr. 23, 1996 [JP] Japan ................................. 8-101675

[51] Int. Cl.[6] ........................................ F02M 25/07
[52] U.S. Cl. ............................. 123/569; 123/571
[58] Field of Search ....................... 123/569, 571; 60/605.2

[56] References Cited

U.S. PATENT DOCUMENTS

| | | | |
|---|---|---|---|
| 4,455,987 | 6/1984 | Sudbeck et al. | 123/569 |
| 4,479,473 | 10/1984 | Wade | 123/569 |
| 4,485,794 | 12/1984 | Kimberley et al. | 123/569 |
| 4,509,492 | 4/1985 | Ochiai et al. | 123/569 |
| 4,644,926 | 2/1987 | Sakurai et al. | 123/569 |
| 5,115,789 | 5/1992 | Aoyama | 123/569 |
| 5,150,694 | 9/1992 | Currie et al. | 123/569 |
| 5,520,161 | 5/1996 | Klopp | 123/569 |
| 5,671,600 | 9/1997 | Pischinger et al. | 123/569 |
| 5,682,864 | 11/1997 | Shirakawa | 123/569 |

FOREIGN PATENT DOCUMENTS

| | | |
|---|---|---|
| 0639710A1 | 2/1995 | European Pat. Off. |
| 2415725 | 8/1979 | France |
| 60-256523A | 12/1985 | Japan |

*Primary Examiner*—Willis R. Wolfe
*Attorney, Agent, or Firm*—Kenyon & Kenyon

[57] ABSTRACT

A compression-ignition type engine in which fuel is injected in a combustion chamber during the compression stroke or intake stroke before 60 degrees before top dead center of the compression stroke and in which the mean particle size of the fuel injected at that time is made a size in which the temperature of the particles reaches the boiling point of the main ingredient of the fuel, determined by the pressure in the combustion chamber, at substantially the top dead center of the compression stroke. At least when the engine is operating under a heavy load, the EGR ratio is made more than 40 percent and the air excess ratio is made approximately 1.0.

18 Claims, 20 Drawing Sheets

COMPRESSION-IGNITION TYPE ENGINE

BACKGROUND OF THE INVENTION

1. Field of the Invention

The present invention relates to a compression-ignition type engine.

2. Description of the Related Art

Known in the art is a compression-ignition type engine where fuel is injected into a combustion chamber during a compression stroke before 60 degrees before top dead center of the compression stroke or intake stroke, the mean particle size of the fuel injected at that time is made at least a particle size by which the temperature of the fuel droplets reaches the boiling point of the main ingredient of the fuel determined by the pressure at that time about at the top dead center of the compression stroke or after top dead center of the compression stroke to prevent vaporization of the fuel from the fuel droplets due to boiling until after injection and reaching about top dead center of the compression stroke and to make the fuel of the fuel droplets boil and evaporate after about top dead center of the compression stroke to cause ignition and combustion (see European Patent Publication No. 0639710). In this compression-ignition type engine, when the fuel droplets are made to uniformly diffuse in the combustion chamber, the amount of $NO_x$ generated becomes substantially zero.

In practice, however, it is difficult to cause the fuel droplets to uniformly diffuse in the combustion chamber and in fact the density of the fuel droplets in the combustion chamber varies. That is, in the combustion chamber there is a mixture of regions of high density of fuel droplets and regions of low density of fuel droplets. If however there are regions of high density of fuel droplets in the combustion chamber in this way, soot and $NO_x$ are generated. The reason for this will be explained later in more detail, but generally speaking is as follows:

That is, as explained above, if the fuel is injected early in the compression stroke and the particle size of the fuel droplets at that time is large, then the vaporization of the fuel from the fuel droplets due to boiling will be prevented until about top dead center of the compression stroke. Even in the period until about top dead center of the compression stroke is reached, however, fuel is vaporized by means other than boiling. Therefore, if fuel is injected, a layer of vaporized fuel will form around the fuel droplets.

On the other hand, if the compression stroke continues, the temperature in the combustion chamber will rise. When the temperature in the combustion chamber reaches over a certain temperature, the vaporized fuel around the fuel droplets will be burned while bonding with oxygen. If the density of the fuel droplets at this time is high, then the fuel droplets will receive the heat of combustion of the fuel vaporized from the surrounding fuel droplets and become high in temperature. As a result, the hydrocarbons in the fuel droplets will be decomposed by heat into hydrogen molecules $H_2$ and carbon C. The hydrogen molecules $H_2$ produced by this heat decomposition will burn explosively and create a high temperature, therefore $NO_x$ will be generated. On the other hand, if carbon C is produced by heat decomposition, the carbon atoms will bond with each other and as a result soot will be generated.

In this way, if the density of the fuel droplets is high, $NO_x$ and soot will be generated due to the heat decomposition of the hydrocarbons in the fuel droplets. To prevent the generation of this $NO_x$ and soot, it is sufficient to suppress the oxidation reaction of the vaporized fuel around the fuel droplets. Therefore, it is sufficient to reduce the density of the oxygen around the fuel droplets.

SUMMARY OF THE INVENTION

An object of the present invention is to provide a compression-ignition type engine capable of reducing the amount of generation of soot and $NO_x$ to almost zero.

According to the present invention, there is provided a compression-ignition type engine having a combustion chamber, an intake passage, and an exhaust passage, the engine comprising injection means for injecting fuel in the combustion chamber and forming fuel droplets diffused in the combustion chamber, the mean value of the particle size of the fuel droplets being larger than a predetermined particle size at which the temperature of the fuel droplets having the predetermined particle size reaches a boiling point of a main ingredient of the fuel, which boiling point is determined by pressure in the combustion chamber, at about the top dead center of the compression stroke; injection time control means for controlling the injection means to carry out an injecting operation by the injection means at a predetermined timing during a period from the start of an intake stroke to approximately 60 degrees before top dead center of the compression stroke; an exhaust gas recirculation passage interconnecting the exhaust passage to the intake passage; and exhaust gas recirculation control means for controlling an amount of exhaust gas recirculated to the intake passage from the exhaust passage to make an exhaust gas recirculation ratio more than approximately 40 percent at least when the engine is operating under a heavy load.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Figure 1:
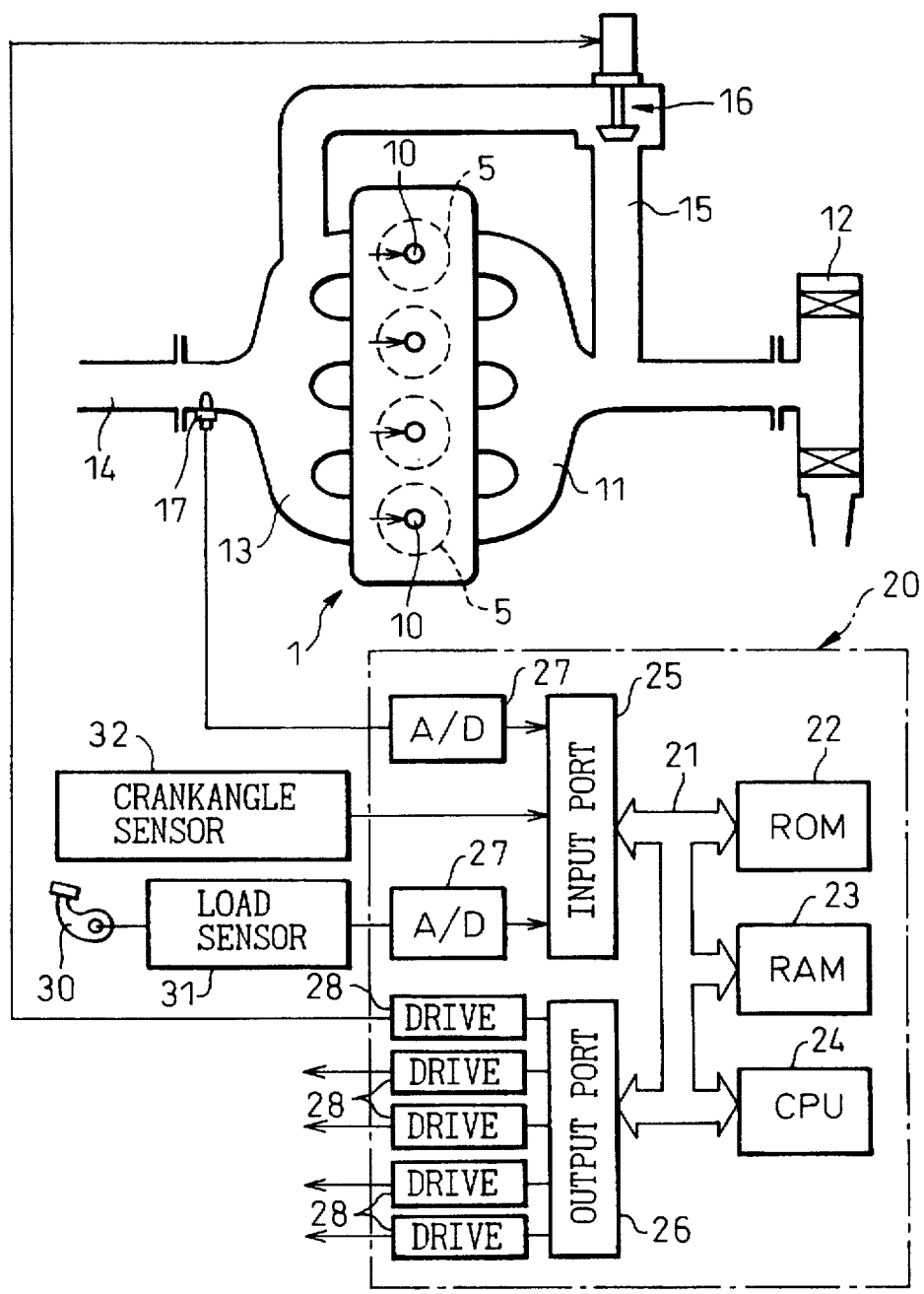
FIG. 1 is an overall view of a compression-ignition type engine.
Figure 2:
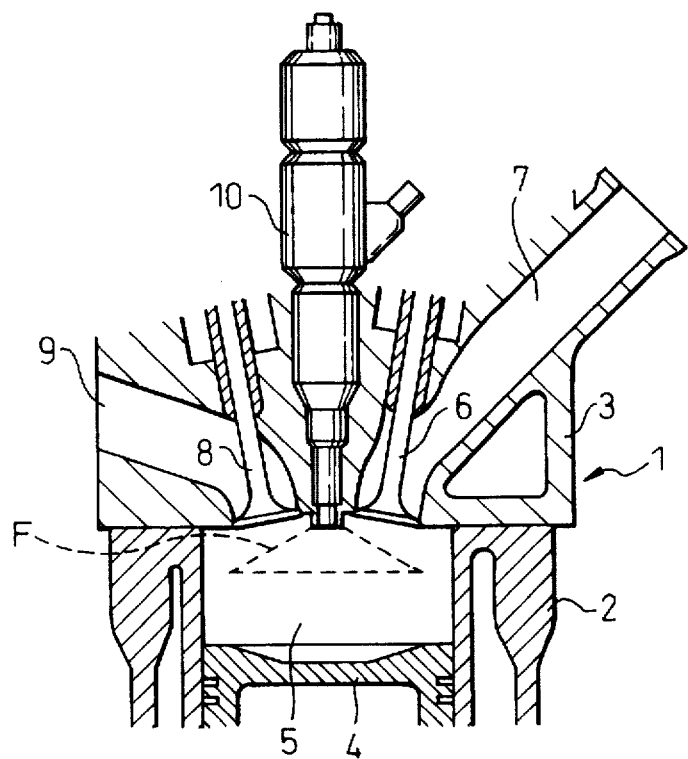
FIG. 2 is a side sectional view of a compression-ignition type engine.
Figure 3:
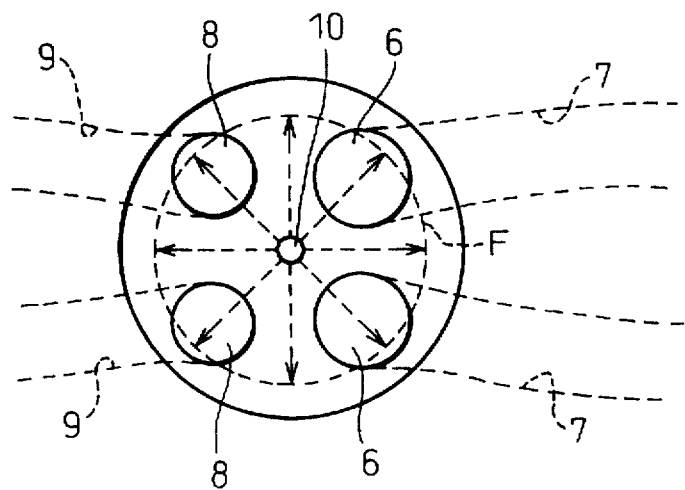
FIG. 3 is a bottom view of a cylinder head of FIG. 2.

FIG. 1 to FIG. 3 show the case of application of the present invention to a four-stroke compression-ignition type engine. The present invention, however, can also be applied to spark ignition type gasoline engines as well.

Referring to FIG. 1 to FIG. 3, 1 designates an engine body, 2 a cylinder block, 3 a cylinder head, 4 a piston, 5 a combustion chamber, 6 a pair of intake valves, 7 a pair of intake ports, 8 a pair of exhaust valves, 9 a pair of exhaust ports, and 10 a fuel injector arranged at the top center of the combustion chamber 5. The intake valves 7 are connected through an intake manifold 11 to an air cleaner 12, while the exhaust valves 9 are connected through an exhaust manifold 13 to an exhaust pipe 14. The exhaust manifold 13 and the collecting portion of the intake manifold 11 are connected with each other by an exhaust gas recirculation (EGR) passage 15. In the EGR passage 15 is provided an EGR control valve 16. This EGR control valve 16 is controlled based on the output signal of an electronic control unit 20. As shown in FIG. 2 and FIG. 3, the intake ports 7 are comprised of through ports extending substantially straight, therefore in the compression-ignition type engine shown in FIG. 1 to FIG. 3, a swirl cannot be generated in the combustion chamber 5 by the flow of air flowing from an intake port 7 to the combustion chamber 5.

As shown in FIG. 1, the electronic control unit 20 is comprised of a digital computer and is provided with a ROM (read only memory) 22, a RAM (random access memory) 23, a CPU (microprocessor) 24, an input port 25, and an output port 26 connected with each other by a bidirectional bus 21. Inside the exhaust manifold 13 is provided an air-fuel ratio sensor 17 for detecting the air-fuel ratio in the combustion chamber 5 from the concentration of oxygen in the exhaust gas. The output signal of the air-fuel ratio sensor 17 is input to the input port 25 through a corresponding AD converter 27. Further, an accelerator pedal 30 is connected to a load sensor 31 generating an output voltage proportional to the amount of depression of the accelerator pedal 30. The output voltage of the load sensor 31 is input to the input port 25 through a corresponding AD converter 27. Further, the input port 25 has connected to it a crank angle sensor 32 generating an output pulse every time the engine turns by a certain crank angle. The current crank angle and the engine speed are calculated from the output pulses of this crank angle sensor 32. On the other hand, the output port 26 is connected to a corresponding drive circuit 28 to each fuel injector 10 and EGR control valve 16.

Figure 4:
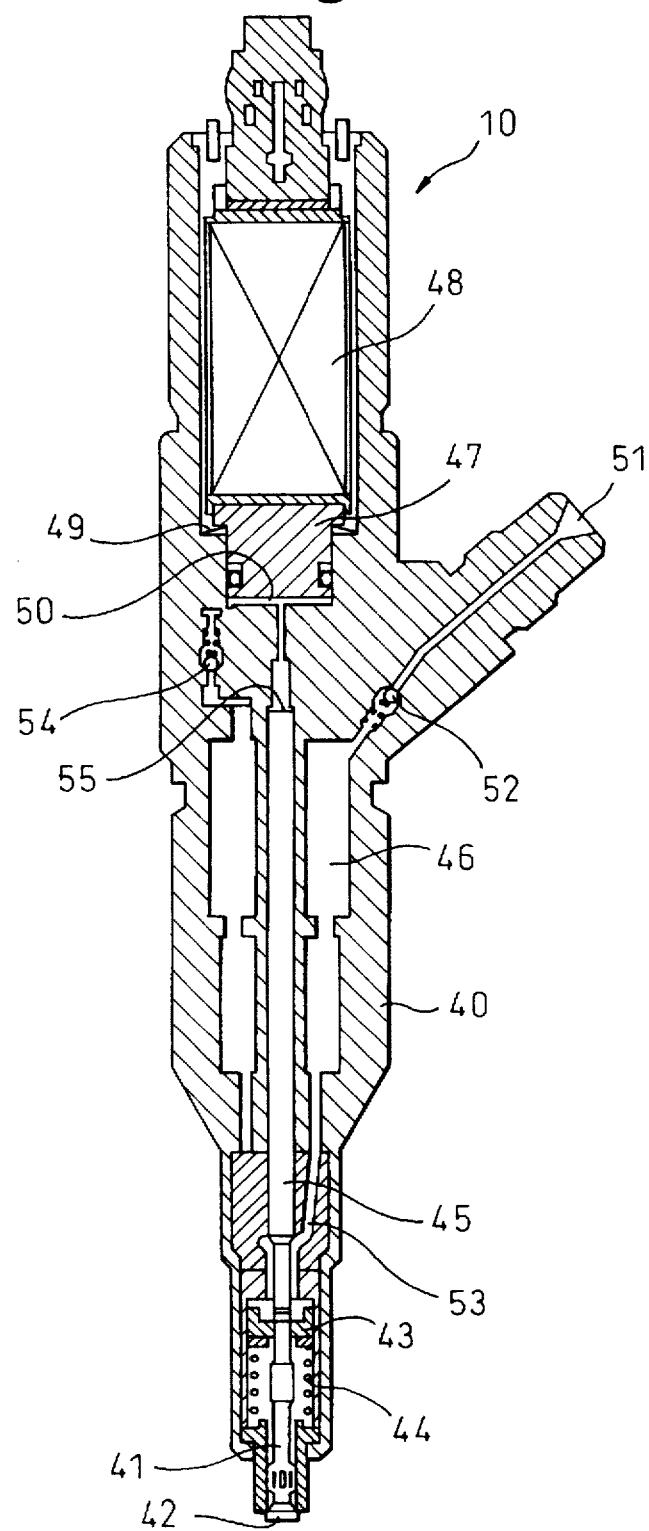
FIG. 4 is a side sectional view of a fuel injector.

FIG. 4 is a side sectional view of a fuel injector 10. Referring to FIG. 4, 41 is a needle able to slide in a fuel injector body 40, 42 is a valve body formed integrally with the front end of the needle 41, 43 is a spring retainer attached to the top end of the needle 41, 44 is a compression spring biasing the spring retainer 43 upward, 45 is a rod aligned with the needle 41, 46 is a fuel storage chamber having a capacity several tens of times larger than the amount of the fuel injected at the time of the maximum amount of injection, 47 is a piston slidably arranged in the fuel injector body 40, 48 is a piezoelectric element for driving the piston 47, 49 is a plate spring for biasing the piston 47 toward the piezoelectric element 48, 50 is a variable capacity chamber defined by the top face of the piston 47, and 51 is a fuel supply port.

The fuel supply port 51 is connected to an injection pump (not shown). The fuel discharged from the injection pump is supplied to the fuel supply port 51. The fuel supplied to the fuel supply port 51 is supplied from the fuel supply port through a check valve 52 which allows flow only toward the fuel storage chamber 46 to the fuel storage chamber 46. The fuel supplied into the fuel storage chamber 46 is on the one hand led to around the front end of the needle 41 through the fuel passage 53 and on the other hand is supplied from the fuel storage chamber 46 through a check valve 54 which allows flow only toward the variable capacity chamber 50 to the variable capacity chamber 50. The fuel supplied into the variable capacity chamber 50 is led to the top face 55 of the rod 45. Therefore, the fuel pressure in the variable capacity chamber 50 acts on the top face 55 of the rod 45.

Figure 5:
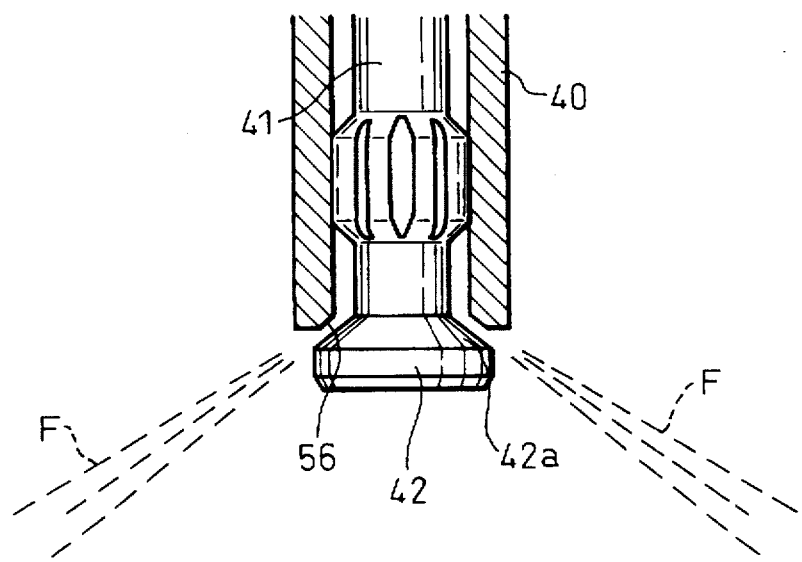
FIG. 5 is an enlarged side sectional view of a front end of a fuel injector.

FIG. 5 shows the front end of the needle 41. As shown in FIG. 5, the valve body 42 of the needle 41 has a conically shaped injected fuel guide face 42a. This injected fuel guide face 42a normally sits on the seat face 56 due to the spring force of the compression spring 44 (FIG. 4). At this time the injection of fuel from the fuel injector 10 is made to stop. When fuel should be injected from the fuel injector 10, the piezoelectric element 48 is charged. When the piezoelectric element 48 is charged, the piezoelectric element 48 expands in the axial direction, so the piston 47 is made to descend. When the piston 47 is made to descend, the fuel pressure in the variable capacity chamber 50 rises and therefore the rod 45 is made to descend, so the needle 41 descends and the valve body 42 separates from the seat face 56. As a result, the fuel in the fuel storage chamber 46 is injected between the valve body 42 and the seat face 56.

Next, when the charge given to the piezoelectric element 48 is discharged, the piezoelectric element 48 contracts in the axial direction and the piston 47 rises. As a result, the fuel pressure in the variable capacity chamber 50 falls, so the rod 45 and the needle 41 rise due to the spring force of the compression spring 44 and the injected fuel guide face 42a of the valve body 42 once again sits on the seat face 56. Therefore, the action of injection of fuel is made to stop.

As shown in FIG. 5, at the time of fuel injection, the injected fuel F is guided by the injected fuel guide face 42a of the valve body 42 and spreads as a conical thin film from the front end of the needle 41, that is, from the nozzle port of the fuel injector 10. In the embodiment shown in FIG. 1 to FIG. 3, the fuel injector 10 is arranged at the center of the top of the combustion chamber 5 and therefore in this embodiment, as shown in FIG. 1, the fuel F is injected from the top center of the combustion chamber 5 toward the periphery of the combustion chamber 5 so as to spread in a conical thin film form.

Next, an explanation will be made of the method of combustion, the basic concept of the present invention, referring to FIG. 6 to FIG. 9. Note that the method of combustion will be explained focusing on the time of high load operation when soot and $NO_x$ are most easily generated.

In so far as the fuel is injected atomized so that like in the past the mean particle size of the fuel droplets becomes less than 50 µm, no matter how the injection timing is set and no matter how the fuel injection pressure is set, it is difficult to simultaneously reduce the soot and $NO_x$ and on top of this impossible to make the amount of generation of soot and $NO_x$ substantially zero. This is due to the inherent problems in the conventional method of combustion. That is, in the conventional method of combustion, since the particle size of the fuel droplets was small, when the fuel was just being injected, part of the fuel would immediately vaporize and that vaporized fuel would cause rapid combustion to start early. If rapid combustion is started early after the start of injection in this way, the successively injected fuel would enter into the flame of combustion, so the injected fuel would be burned in a state of air shortage and therefore soot would be generated. Further, if the injected fuel rapidly burns early and the combustion pressure rapidly rises, the combustion temperature would become higher and therefore $NO_x$ would be generated.

However, it was learned that if the mean particle size of the injected fuel was made much larger than the mean particle size used in the conventional method of combustion and further the combustion timing was made considerably earlier than the injection timing normally used in the conventional method of combustion, the amount of soot and $NO_x$ generated can be reduced to substantially zero. This will be explained next.

Figure 6:
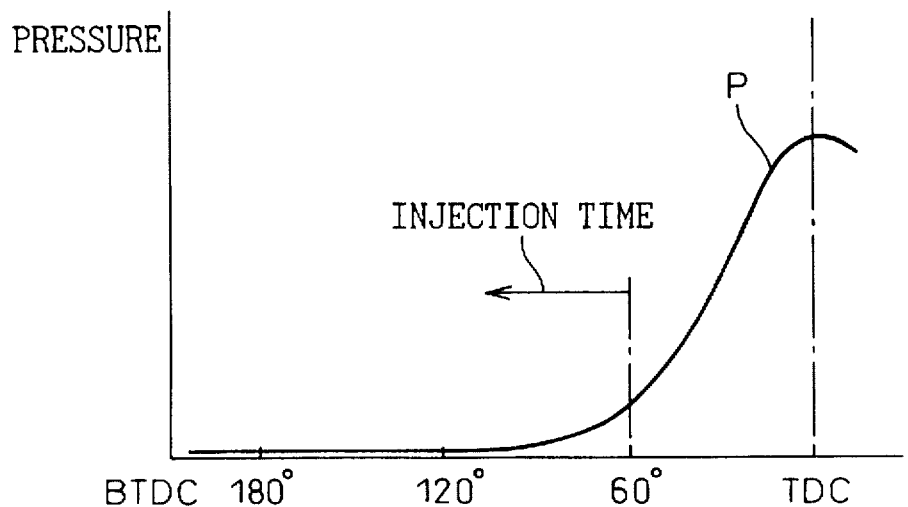
FIG. 6 is a view of changes in pressure in a combustion chamber due to just the compression action of a piston.

The curve of FIG. 6 shows the changes in the pressure P in the combustion chamber 5 due to just the compressive action of the piston 4. As will be understood from FIG. 6, the pressure P in the combustion chamber 5 rises rapidly when 60 degrees before top dead center of the compression stroke BTDC is exceeded. This has nothing to do with the timing of closing of the intake valve 6. No matter what the reciprocating type internal combustion engine, the pressure P in the combustion chamber 5 changes as shown in FIG. 6.

Figure 7:
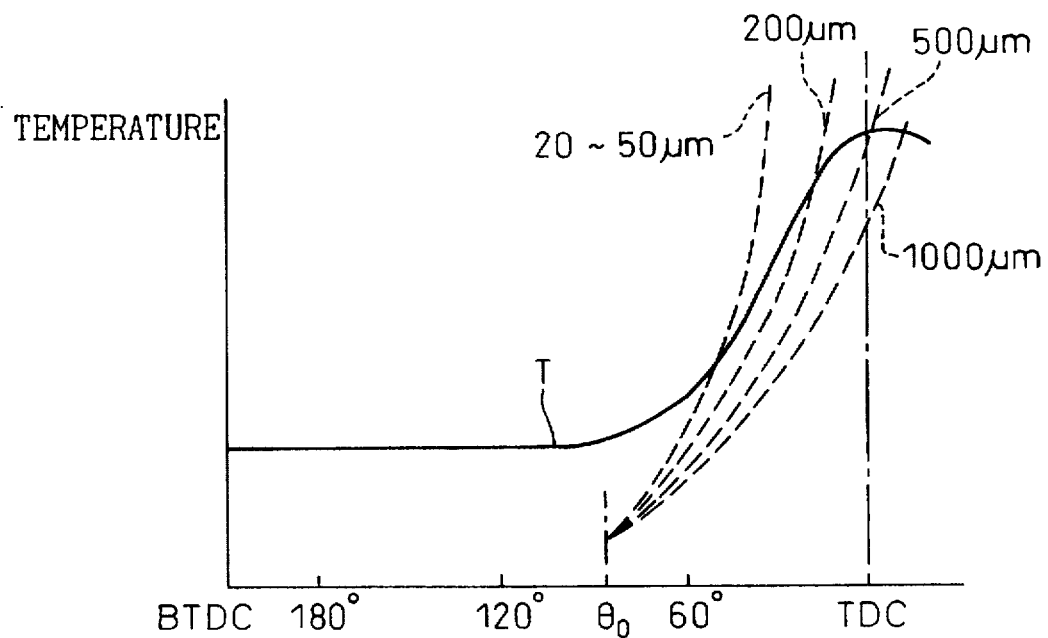
FIG. 7 is a view of the boiling point and the changes in temperature of the fuel droplets.

The curve shown by the solid line in FIG. 7 shows the boiling temperature, that is, the boiling point T, of the fuel at different crank angles. If the pressure P in the combustion chamber 5 rises, the boiling point T of the fuel will also rise along with it, so the boiling point T of the fuel will rise rapidly as well when about 60 degrees before top dead center of the compression stroke BTDC is exceeded. On the other hand, the broken lines in FIG. 7 show the difference in the temperature changes of the fuel droplets due to the difference of the size of the fuel droplets when the fuel is injected at $\theta_0$ degrees before top dead center of the compression stroke BTDC. The temperature of the fuel droplets just after injection is lower than the boiling point T determined by the pressure at that time. Next, the fuel droplets rise in temperature as they receive the heat from their surroundings. The rate of rise of the temperature of the fuel droplets becomes faster the smaller the particle size.

That is, assuming that the particle size of the fuel droplets is from 20 µm to 50 µm, the temperature of the fuel droplets rapidly rises after injection and reaches the boiling point T at a crank angle far before the top dead center of the compression stroke TDC so the rapid action of vaporization of the fuel from the fuel droplets due to boiling from the fuel is commenced. Further, as understood from FIG. 7, even when the particle size of the fuel droplets is 200 µm, the temperature of the fuel droplets reaches the boiling point T and the action of rapid vaporization of the fuel due to boiling is started before the top dead center of the compression stroke TDC is reached. When the action of rapid vaporization of the fuel due to boiling is started before the top dead center of the compression stroke TDC is reached in this way, explosive combustion due to the vaporized fuel occurs and therefore as explained above large amounts of soot and $NO_x$ are generated.

As opposed to this, when the size of the fuel droplets becomes larger than even 500 µm, the rate of rise of the temperature of the fuel droplets becomes slower, so the temperature of the fuel droplets does not reach the boiling point T until about the top dead center of the compression stroke TDC or later. Therefore, if the size of the fuel droplets is made larger than about 500 µm, no action of rapid vaporization of fuel due to boiling will occur before about top dead center of the compression stroke and the action of rapid vaporization of the fuel due to boiling will commence about at the top dead center of the compression stroke TDC or after top dead center of the compression stroke TDC. Therefore, if the size of the fuel droplets becomes larger than 500 µm, it becomes possible to prevent generation of soot and $NO_x$ based on the boiling and vaporization of the fuel before the top dead center of the compression stroke TDC.

Note that in actuality fuel includes various ingredients with different boiling points. When speaking of the boiling point of fuel, there are therefore a number of such boiling points. Consequently, when thinking of the boiling point, it can be said to be preferable to think of the boiling point of the main ingredient of the fuel. Further, the particle size of the injected fuel can never be completely uniform, so when thinking of the particle size of the injected fuel, it can be said to be preferable to think of the mean particle size of the injected fuel. Considered in this way, by making the mean particle size of the injected fuel at least the particle size whereby the temperature of the fuel droplets reaches the boiling point T of the main ingredient of the fuel determined by the pressure at about top dead center of the compression stroke TDC or after top dead center of the compression stroke TDC, there will be no rapid vaporization of the fuel from the fuel droplets due to boiling until after injection when about top dead center of the compression stroke TDC is reached and rapid vaporization due to boiling from the fuel droplets will occur after about top dead center of the compression stroke TDC.

To make the amount of generation of the soot and $NO_x$ substantially zero, in addition to making the size of the fuel droplets larger than substantially 500 µm or so, it becomes necessary to diffuse the injected fuel droplets into the combustion chamber 5 uniformly. Next, this will be explained with reference to FIGS. 8A and 8B. Note that in FIGS. 8A and 8B, X shows the fuel droplets.

As explained above, if the fuel is injected early in the compression stroke and the size of the fuel droplets X at that time is made larger than about 500 µm or so, the action of vaporization of the fuel from the fuel droplets X due to boiling will be prevented until about top dead center of the compression stroke TDC is reached. However, there is an action of vaporization of the fuel not due to boiling even in the interval before about top dead center of the compression stroke TDC is reached, therefore a layer of vaporized fuel is formed around the fuel droplets X when the fuel is injected.

Figure 8A:
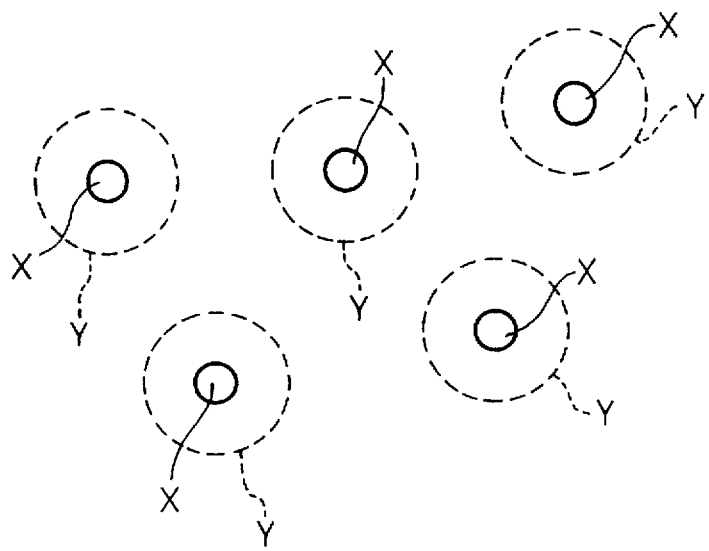
FIGS. 8A and 8B are views of the distribution of the fuel droplets.

On the other hand, when the compression stroke progresses, the temperature inside the combustion chamber 5 rises. When the temperature inside the combustion chamber 5 reaches at least a certain temperature, the vaporized fuel around the fuel droplets X will be burned while bonding with oxygen. That is, combustion by an oxidation reaction of the vaporized fuel around the fuel droplets X is started. At this time, the region where the heat of combustion of the vaporized fuel around the fuel droplets X reaches is shown by the broken lines Y around the fuel droplets X in FIGS. 8A and 8B. As shown in FIG. 8A, when the density of the fuel droplets X is low, these regions Y are separate from each other, while, as shown by FIG. 8B, when the density of the fuel droplets X is high, the regions Y overlap each other.

Figure 8B:
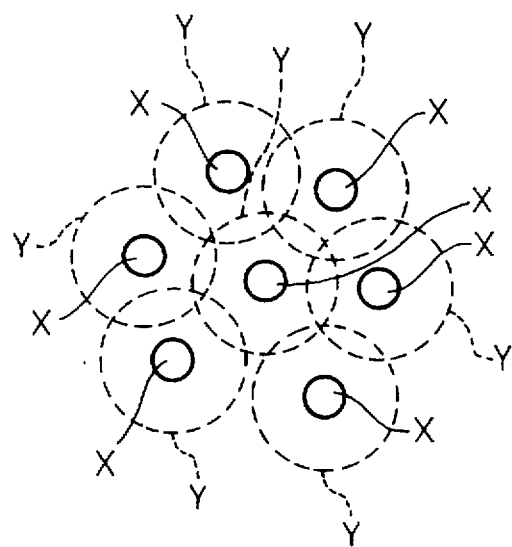

When the regions Y overlap each other as shown in FIG. 8B, the heat of combustion of the vaporized fuel around the fuel droplets X causes the temperature of the spaces between the fuel droplets X to become higher. When the temperature of the spaces between the fuel droplets X becomes higher in this way, the fuel droplets X become high in temperature and as a result the hydrocarbons in the fuel droplets X are decomposed by the heat into hydrogen molecules $H_2$, carbon C and methane $CH_4$. As a result, if the temperature in the combustion chamber 5 rises, the hydrogen molecules $H_2$ will explosively burn and cause the temperature inside the combustion chamber 5 to become extremely high, so a large amount of $NO_x$ will be produced. Further, if carbon C is produced due to the heat decomposition, the carbon atoms will bond with each other and form soot.

As opposed to this, if the regions Y are separate from each other as shown by FIG. 8A, the heat of combustion of the vaporized fuel around the fuel droplets X will not be transmitted to the regions Y of the other adjoining fuel droplets and as a result the temperatures of the fuel droplets X will not become that high. As a result, no heat decomposition of the hydrocarbons in the fuel droplets X will occur and therefore there will be no explosive combustion due to the hydrogen molecules $H_2$. Consequently, the temperature inside the combustion chamber 5 will not become extremely high, so generation of $NO_x$ will be prevented. Further, since there is no production of carbon C due to the heat decomposition, carbon atoms will not bond with each other and grow to soot. In this way, by making the fuel droplets X diffuse uniformly and the density of the fuel droplets X low as shown in FIG. 8A, it becomes possible to prevent the generation of soot and $NO_x$.

Figure 9A:
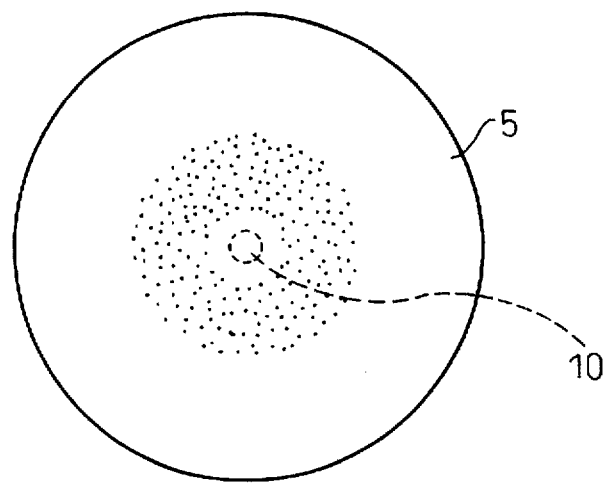
FIGS. 9A and 9B are views of the distribution of the fuel droplets.
Figure 9B:
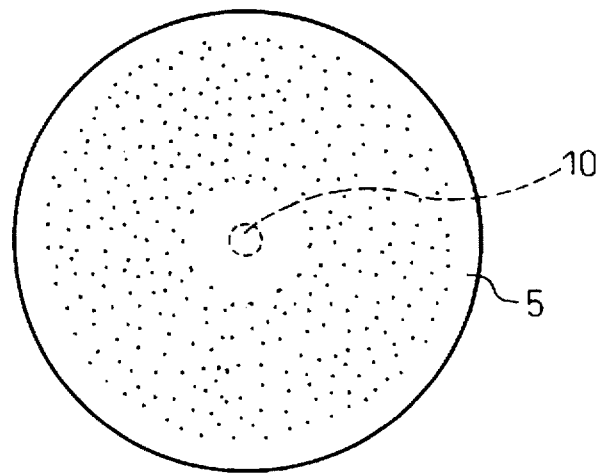

To make the fuel droplets X diffuse uniformly as shown in FIG. 8A, however, it is necessary to cause the fuel to be injected from the fuel injector 10 when the pressure P inside the combustion chamber 5 is low. That is, if the pressure P inside the combustion chamber 5 becomes high, the air resistance becomes larger, so the flight distance of the injected fuel becomes shorter and therefore at this time, as shown in FIG. 9A, the fuel droplets cannot diffuse spread out into the entire interior of the combustion chamber 5. As explained above, the pressure rises rapidly and becomes high when 60 degrees before top dead center of the compression stroke BTDC is exceeded. If fuel is injected after about 60 degrees before top dead center of the compression stroke is exceeded, in fact, as shown in FIG. 9A, the fuel droplets will not diffuse sufficiently inside the combustion chamber 5. As opposed to this, before about 60 degrees before top dead center of the compression stroke BTDC, the pressure P inside the combustion chamber 5 is low and therefore if fuel is injected before about 60 degrees before top dead center of the compression stroke BTDC, as shown in FIG. 9B, the fuel droplets will diffuse uniformly throughout the entire interior of the combustion chamber 5. Therefore, by injecting the fuel before 60 degrees before top dead center of the compression stroke BTDC, generation of soot and $NO_x$ is prevented. Note that in this case, the timing of injection of the fuel may be in the compression stroke or intake stroke if before 60 degrees before top dead center of the compression stroke BTDC.

The important point in this method of combustion is to cause fuel of a large particle size to diffuse in the entire interior of the combustion chamber 5 with the fuel droplets separate from each other. Therefore, when viewed from the perspective of the hardware, the fuel injector 10 plays an important role in the method of combustion. FIG. 4 shows an example of the fuel injector 10 suitable for working this method of combustion. In this fuel injector 10, the fuel injection pressure is set to a low pressure of about 20 Mpa so as to enable the size of the fuel droplets to be made larger.

By making the size of the fuel droplets larger than 500 μm or so and making the fuel injection timing before 60 degrees before top dead center of the compression stroke BTDC in this way, the action of rapid vaporization of the fuel due to boiling starts at about the top dead center of the compression stroke TDC or after top dead center of the compression stroke TDC and the density of the fuel droplets X becomes lower as shown in FIG. 8A, so the amount of generation of soot and $NO_x$ can be made substantially zero.

In practice, however, it is difficult to cause the fuel droplets X to uniformly diffuse in the combustion chamber 5 and in fact the density of the fuel droplets X in the combustion chamber 5 varies. That is, in the combustion chamber there is a mixture of regions of high density of fuel droplets X as shown in FIG. 8B and regions of low density of fuel droplets X as shown in FIG. 8A. If however there are regions of high density of fuel droplets X in the combustion chamber 5 in this way, soot and $NO_x$ are generated in these regions. In this case, to prevent the generation of the soot and $NO_x$, it is sufficient to suppress the oxidation reaction of the vaporized fuel around the fuel droplets X. For this, it is sufficient to reduce the density of the oxygen around the fuel droplets X.

Therefore, in the present invention, the density of the oxygen around the fuel droplets X is reduced by causing recirculation of EGR gas in the combustion chamber 5 at the time of high engine load operation and setting the exhaust gas recirculation ratio (amount of EGR gas/(amount of EGR gas+amount of intake air)), that is, the EGR ratio, to at least about 40 percent. That is, by setting the EGR ratio to at least about 40 percent at the time of high engine load operation, the density of the oxygen around the fuel droplets X becomes lower and therefore the oxidation reaction of the evaporated fuel around the fuel particles X is suppressed. Accordingly, the action of heat decomposition of the hydrocarbons in the fuel droplets X is suppressed and therefore the amount of production of hydrogen molecules $H_2$ and carbon C becomes smaller, so, as shown in FIG. 8B, even when the density of the fuel droplets X is high, production of soot and $NO_x$ is prevented.

Figure 10:
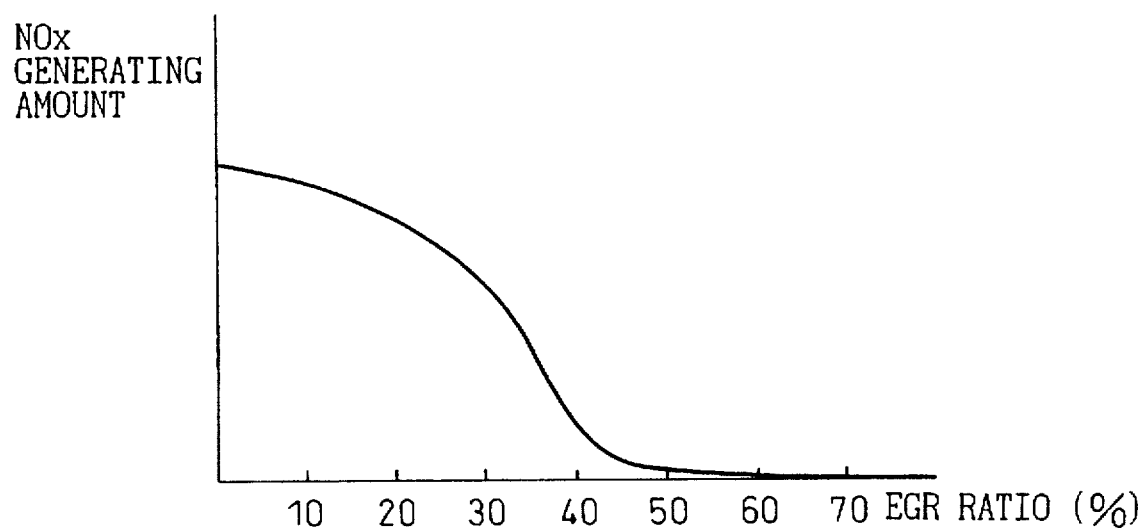
FIG. 10 is a view of the relationship between an amount of generation of $NO_x$ and an EGR ratio.

FIG. 10 shows the relationship between the amount of generation of $NO_x$ and the EGR ratio at the time of high engine load operation. From FIG. 10, it will be understood that when the EGR ratio becomes at least about 40 percent, the amount of generation of $NO_x$ becomes extremely small and when the EGR ratio becomes substantially 50 percent, the amount of generation of $NO_x$ becomes substantially zero. Note that when the EGR ratio becomes substantially 50 percent, it is learned that the amount of soot becomes almost zero.

Figure 11A:
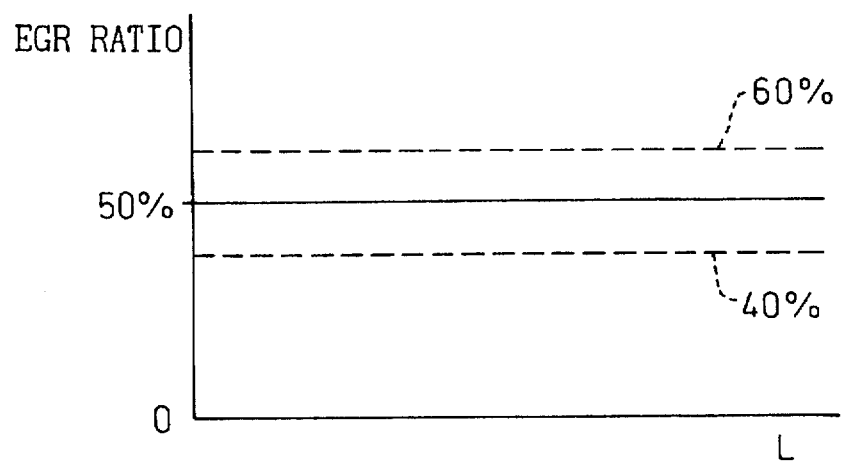
FIGS. 11A and 11B are views of the EGR ratio and air excess ratio.
Figure 11B:
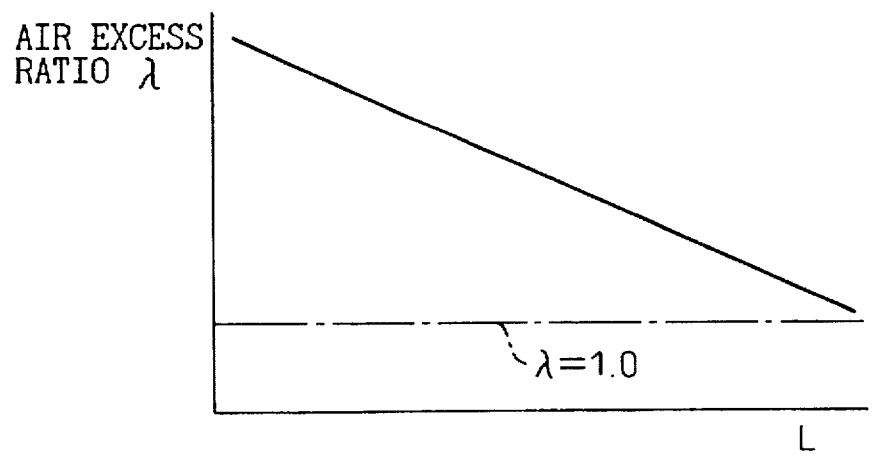

Therefore, in the first embodiment according to the present invention, as shown in FIG. 11A, the EGR ratio is held at substantially 50 percent for all engine loads. Note that FIG. 11A shows the relationship between the engine load that is, the amount of depression of the accelerator pedal, and the EGR ratio, while FIG. 11B shows the relationship between the air excess ratio $\lambda$ and the amount of depression L of the accelerator pedal 30. As explained above, in the first embodiment according to the present invention, as shown in FIG. 11A, the EGR ratio is held at substantially 50 percent at all times regardless of the amount of depression L of the accelerator pedal 30.

Further, in this embodiment, as will be understood from FIG. 11B, at the time of high engine load operation, that is, when the amount of depression L of the accelerator pedal 30 is large, the air excess ratio $\lambda$ is made substantially 1.0. That is, in other words, the ratio between the amount of fuel and the amount of air in the combustion chamber 5, that is, the air-fuel ratio, is made substantially the stoichiometric air-fuel ratio. Note that explaining this in a bit more detail, at this time, the air excess ratio $\lambda$ is controlled to give an excess of 2 percent to 3 percent of air. If the air excess ratio $\lambda$ is made substantially 1.0, the density of the oxygen around the fuel droplets X is further lowered and therefore the oxidation reaction of the vaporized fuel around the fuel droplets X is further suppressed. As a result, the generation of soot and $NO_x$ can be further suppressed.

Further, in this embodiment, since the EGR ratio is held at substantially 50 percent regardless of the amount of depression L of the accelerator pedal 30, as shown in FIG. 11B, the air excess ratio $\lambda$ increases as the amount of depression L of the accelerator pedal 30 becomes smaller. That is the lower the engine load, the smaller the amount of generation of $NO_x$, so in this embodiment, the lower the engine load becomes, the larger the air excess ratio $\lambda$ becomes.

Note that in this embodiment, the EGR ratio is set to substantially 50 percent, but as shown in FIG. 11A, the EGR ratio can be set to any value between substantially 40 percent to substantially 60 percent.

Figure 12A:
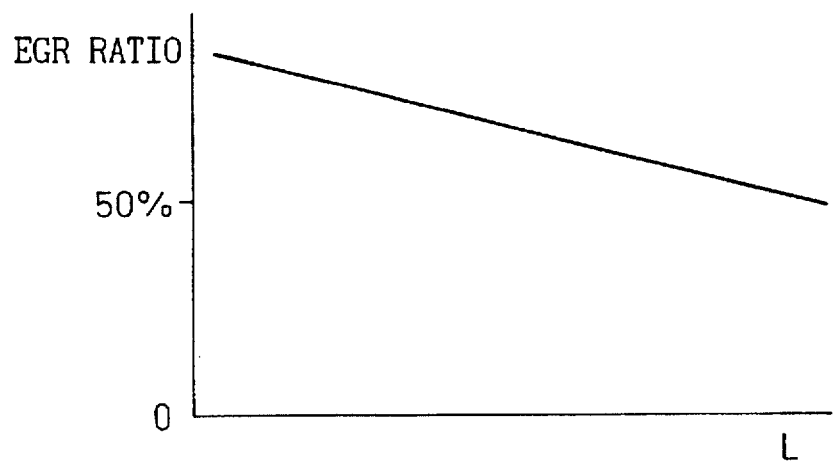
FIGS. 12A and 12B are views of the EGR ratio and air excess ratio.
Figure 12B:
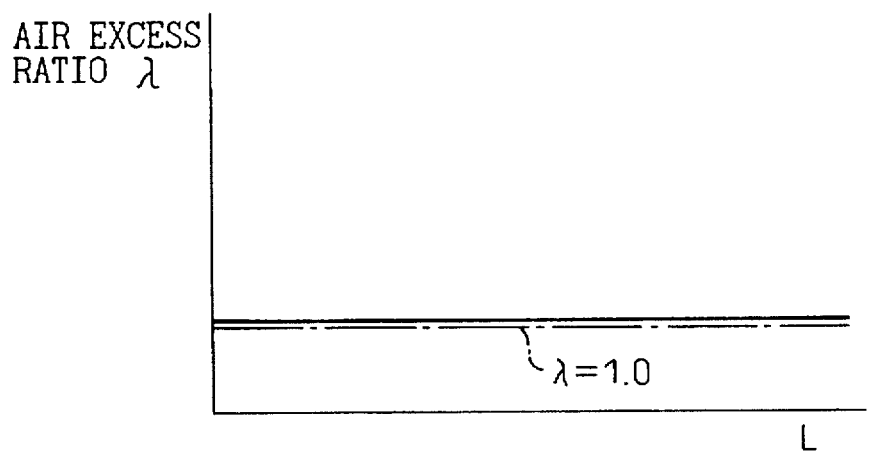

FIGS. 12A and 12B show a second embodiment according to the present invention. In this second embodiment, as shown in FIG. 12B, the air excess ratio $\lambda$ is set to substantially 1.0 regardless of the amount of depression L of the accelerator pedal 30, that is, the air-fuel ratio is controlled to substantially the stoichiometric air-fuel ratio. Therefore, as shown in FIG. 12A, the EGR ratio is made to increase the smaller the amount of depression L of the accelerator pedal 30 becomes.

Figure 13:
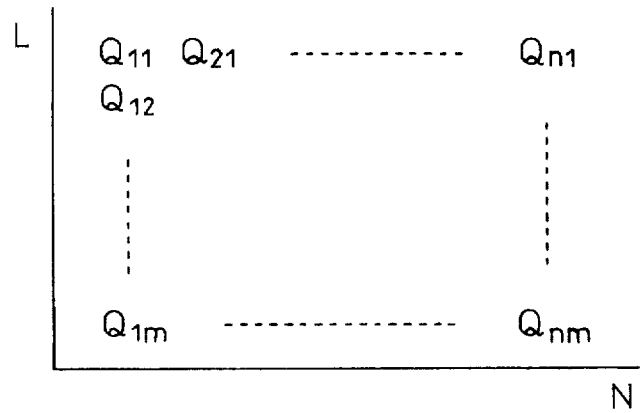
FIG. 13 is a map of the amount of fuel injection.
Figure 14A:
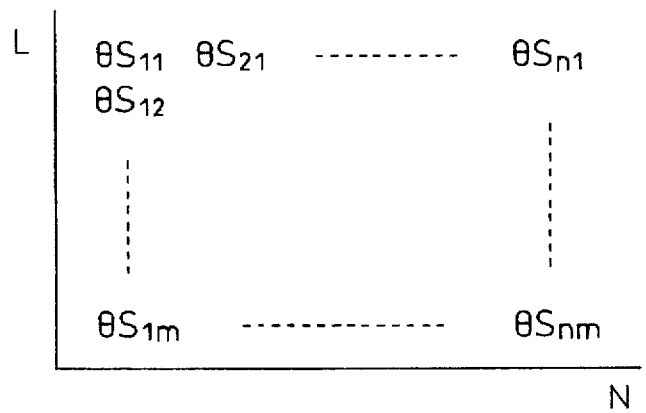
FIGS. 14A and 14B are views of the timing of the start of fuel injection.
Figure 14B:
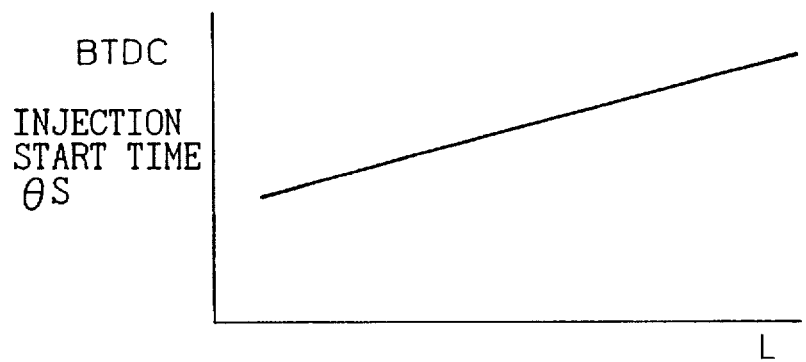

In this embodiment according to the present invention, the amount of fuel injected is determined so that the air excess ratio $\lambda$ becomes the air excess ratio shown in FIG. 11B or FIG. 12B and the amount of fuel injected Q is stored in advance in a ROM 22 as a function of the amount of depression L of the accelerator pedal 30 and the engine speed N in the form of the map shown in FIG. 13. Further, in this embodiment according to the present invention, as shown in FIG. 14B, the timing $\theta S$ of the start of fuel injection is made earlier the greater the amount of depression L of the accelerator pedal 10, that is, the higher the engine load becomes. This timing $\theta S$ of the start of fuel injection is stored in advance in the ROM 22 as a function of the amount of depression L of the accelerator pedal 10 and the engine speed N in the form of the map shown in FIG. 14A.

On the other hand, in the embodiment shown in FIG. 1, the EGR gas is supplied from the EGR passage 15 into the exhaust manifold 11 by the difference between the back pressure in the exhaust manifold 13 and the pressure inside the intake manifold 11. The amount of EGR gas at this time is controlled by the EGR control valve 16. The degree of opening of the EGR control valve 16 required for making the EGR ratio the EGR ratio shown in FIG. 11A or FIG. 11B that is, the duty ratio of the drive pulses of the EGR control valve 16, is found in advance by experiment. The target duty ratio DUO is stored in advance in the ROM as a function of the amount of depression L of the accelerator pedal 30 and the engine speed N in the form of the map shown in FIG. 15.

Figure 16:
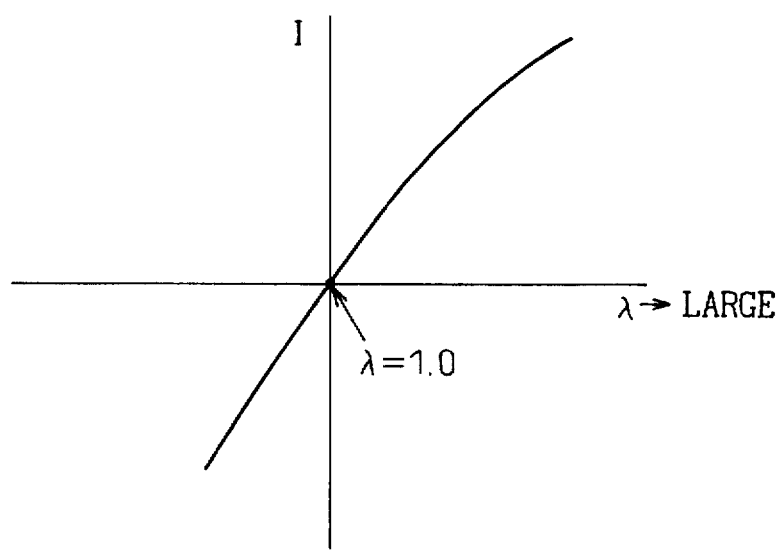
FIG. 16 is a view of the current generated by an air-fuel ratio sensor.

Further, in this embodiment of the present invention, the target duty ratio DUO is corrected by a correction coefficient K so that the air excess ratio $\lambda$ becomes the target air excess ratio shown in FIG. 11B or FIG. 12B. That is, the air-fuel ratio sensor 17 generates a current I corresponding to the air excess ratio $\lambda$ as shown in FIG. 16, therefore, the actual air-fuel ratio is detected from this current value I. On the other hand, the target air excess ratio $\lambda 0$ shown in FIG. 11B or 12B is stored in advance in the ROM 22 as a function of the amount of depression L of the accelerator pedal 30 and the engine speed N in the form of the map shown in FIG. 17. Note that in the second embodiment shown in FIGS. 12A and 12B, the target air excess ratio $\lambda 0$ becomes substantially 1.0 regardless of the operating state of the engine.

Next, an explanation will be given of the routine for control of operation shown in FIG. 18.

Figure 18:
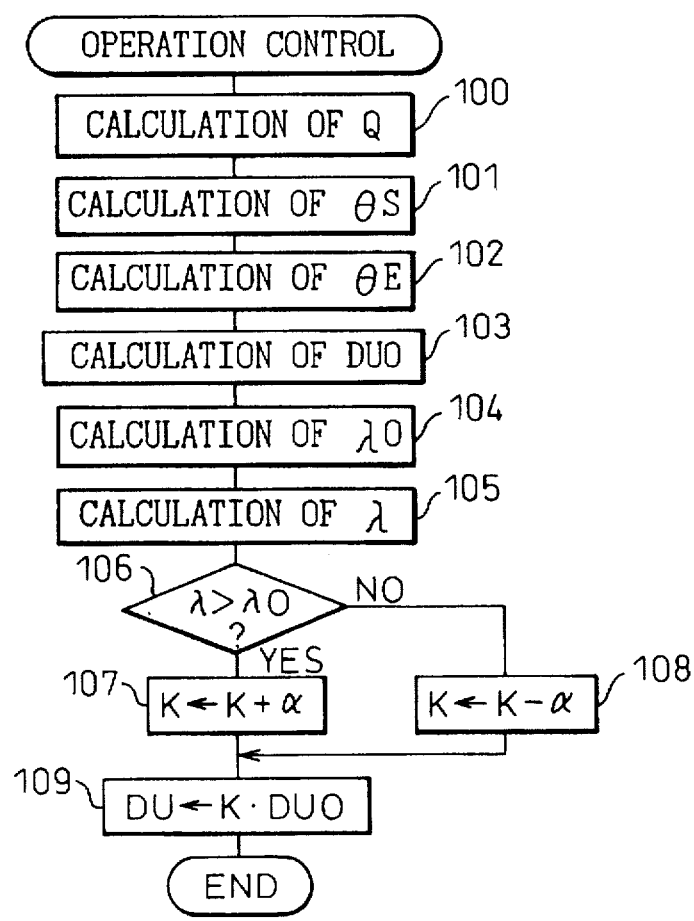
FIG. 18 is a flow chart of the control of the engine operation.

Referring to FIG. 18, first of all, at step 100, the amount of fuel injected Q is calculated from the map shown in FIG. 13. Next, at step 101, the timing $\theta S$ of start of the fuel injection is calculated from the map shown in FIG. 14A. Next, at step 102, the timing $\theta E$ of the end of the fuel injection is calculated from the amount of fuel injected Q, the timing $\theta S$ of start of the fuel injection and the engine speed N. The action of injecting fuel from the fuel injectors 10 is performed based on this timing $\theta S$ of the start of fuel injection and the timing $\theta E$ of the end of the fuel injection.

Figure 15:
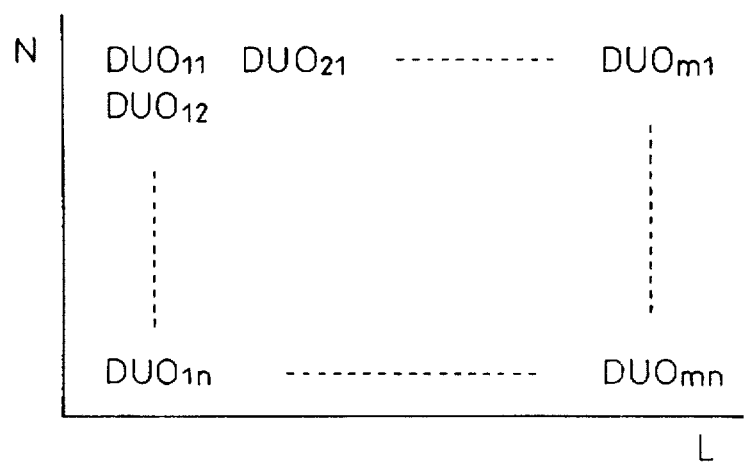
FIG. 15 is a view of a map of a target duty ratio.
Figure 17:
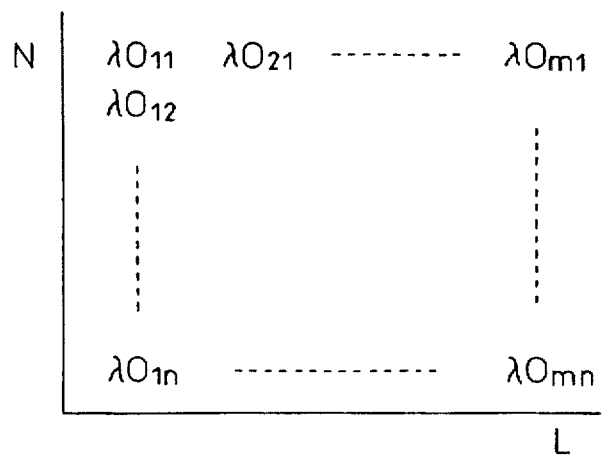
FIG. 17 is a view of a target air excess ratio.

Next, at step 103, the target duty ratio DUO is calculated from the map shown in FIG. 15, then at step 104, the target air excess ratio $\lambda 0$ is calculated from the map shown in FIG. 17. Next, at step 105, the current air excess ratio $\lambda$ is calculated from the output signal of the air-fuel ratio sensor 17. Next, at step 106, whether the current air excess ratio $\lambda$ is larger than the target air excess ratio $\lambda 0$ or not is judged. When $\lambda > \lambda 0$, step 107 is proceeded to, where a constant value $\alpha$ is added to the correction coefficient K, then step 109 is proceeded to. As opposed to this, when $\lambda \leq \lambda 0$, step 108 is proceeded to, where the constant value $\alpha$ is subtracted from the correction coefficient K, then step 109 is proceeded to. At step 109, the target duty ratio DUO is multiplied with the correction coefficient K whereby the final duty ratio DU (=K·DUO) is calculated. The EGR control valve 16 is controlled based on this duty ratio DU.

That is, when the actual air excess ratio $\lambda$ becomes larger than the target air excess ratio $\lambda 0$, the duty ratio DU is increased. As a result, since the degree of opening of the EGR control valve 16 becomes larger, the EGR ratio is increased and therefore the air excess ratio $\lambda$ is reduced. As opposed to this, if the actual air excess ratio $\lambda$ becomes smaller than the target air excess ratio $\lambda 0$, the duty ratio DU is reduced. As a result, the degree of opening of the EGR control valve 16 becomes smaller, so the EGR ratio is reduced and therefore the air excess ratio $\lambda$ is increased. In this way, the EGR ratio is held at substantially the target EGR ratio and the air excess ratio λ is controlled to the target air excess ratio λ0.

If the fuel is injected early in the compression stroke in this way and the size of the fuel droplets X is made large and the EGR ratio raised, the amount of soot and $NO_x$ generated can be reduced to substantially zero. However, even by making the EGR ratio high in this way and thereby reducing the density of the oxygen around the fuel droplets X, if for example the temperature of the suction gas in the combustion chamber 5 becomes high at the time of high engine load operation, the vaporized fuel around the fuel droplets X will burn and therefore there will be the risk of generation of soot and $NO_x$. Therefore, in a third embodiment shown in FIG. 19 and FIG. 20, when the engine load rises and temperature of the suction gas in the combustion chamber 5 becomes high, the EGR gas is cooled so as to lower the temperature of the suction gas in the combustion chamber 5.

Figure 19:
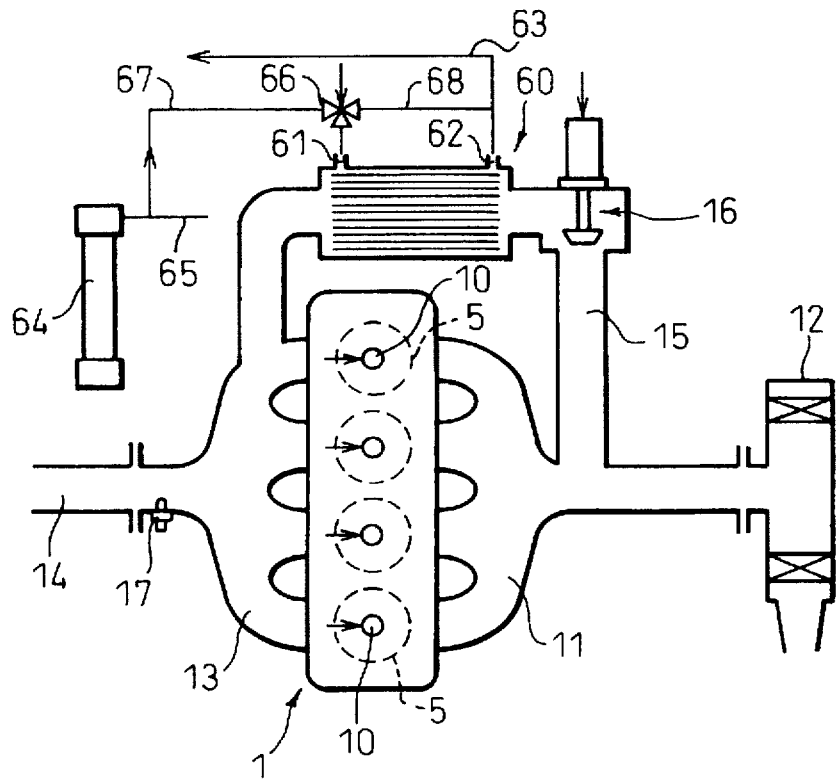
FIG. 19 is an overview of a compression-ignition type engine of another embodiment.

That is, in the third embodiment, as shown in FIG. 19, a cooling device 60 is provided so as to cool the EGR gas in the EGR passage 15. The cooling device 60 is provided with a cooling water inlet 61 and a cooling water outlet 62. The cooling water outlet 62 is connected through the return duct 63 to for example a cooling water intake port of a water pump driven by the engine. On the other hand, a cooling water outflow passage 65 of a radiator 64 is connected through a supply duct 67 to an electromagnetic switching valve 66 controlled by an output signal of an electronic control unit 20 (FIG. 1). Further, the electromagnetic switching valve 66 is connected on the one hand to the return duct 63 through a bypass duct 68 bypassing the cooling device 60 and on the other hand to the cooling water inlet 61. When the switching action of the electromagnetic switching valve 66 causes the supply duct 67 to be connected to the cooling water inlet 61, the cooling water is supplied to the cooling device 60 and thereby the action of cooling the EGR gas is performed. As opposed to this, when the switching action of the electromagnetic switching valve 66 causes the supply duct 67 to be connected to the bypass duct 68, the action of cooling the EGR gas is stopped.

Figure 20:
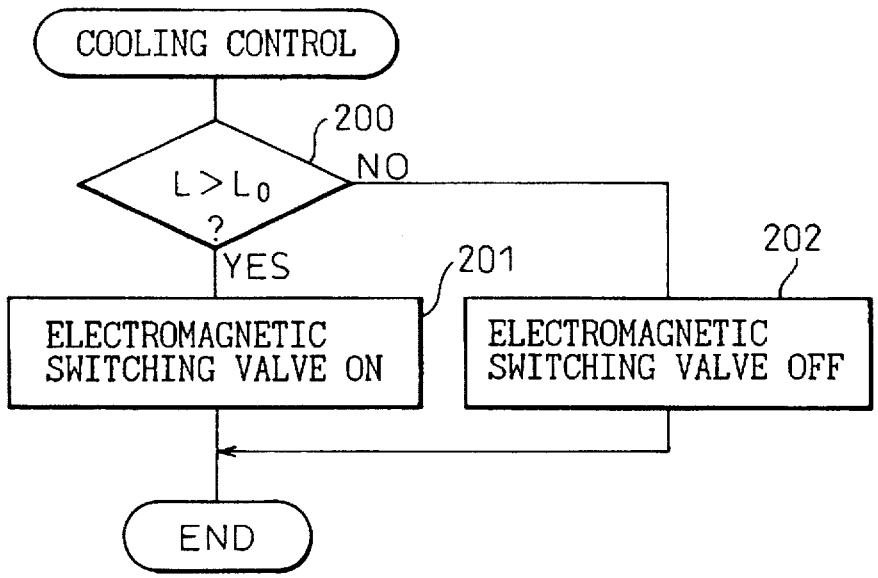
FIG. 20 is a flow chart for the cooling control.

FIG. 20 shows the routine for the control of the cooling operation. Referring to FIG. 20, first, at step 200, whether the engine is operating at a high load or not, that is, whether the amount of depression L of the accelerator pedal 30 is larger than a set value L0 or not is judged. When L>L0, step 201 is proceeded to, where the electromagnetic switching valve 66 is turned on. At this time, the cooling water is supplied to the cooling water inlet 61 of the cooling device 60 and therefore the EGR gas is cooled by the cooling device 60. As opposed to this, when L≦L0, step 202 is proceeded to, where the electromagnetic switching valve 66 is turned off. At this time, the cooling water is returned through the bypass duct 68 and return duct 63 and therefore the action of cooling of the EGR gas by the cooling device 60 is stopped.

In this way, in this embodiment, at the time of a high load operation when the temperature of the suction gas in the combustion chamber 5 becomes high, the EGR gas is cooled by the cooling device 60. As a result, the temperature of the suction gas in the combustion chamber 5 is lowered and therefore the generation of soot and $NO_x$ is suppressed. Note that in this embodiment as well, the EGR ratio is made at least 40 percent regardless of the engine load.

Figure 21:
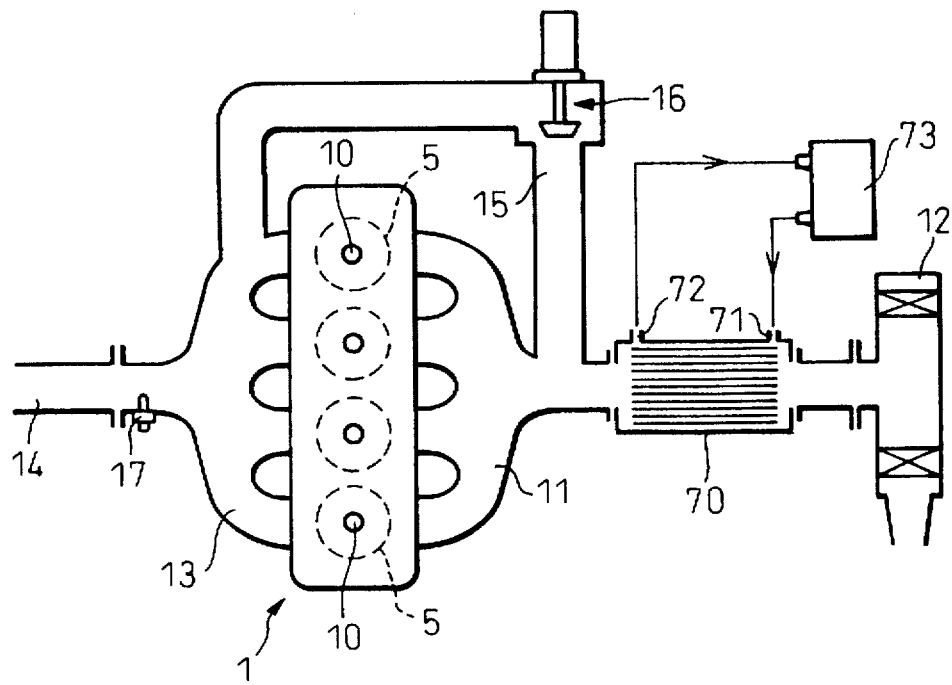
FIG. 21 is an overview of a compression-ignition type engine of still another embodiment.

FIG. 21 shows a fourth embodiment. Referring to FIG. 21, in this embodiment, a cooling device 70 is provided for cooling the intake air between the intake manifold 11 and air cleaner 12. This cooling device 70 has a coolant inlet 71 and a coolant outlet 72. These coolant inlet 71 and coolant outlet 72 are connected to a cooler 73.

Figure 22:
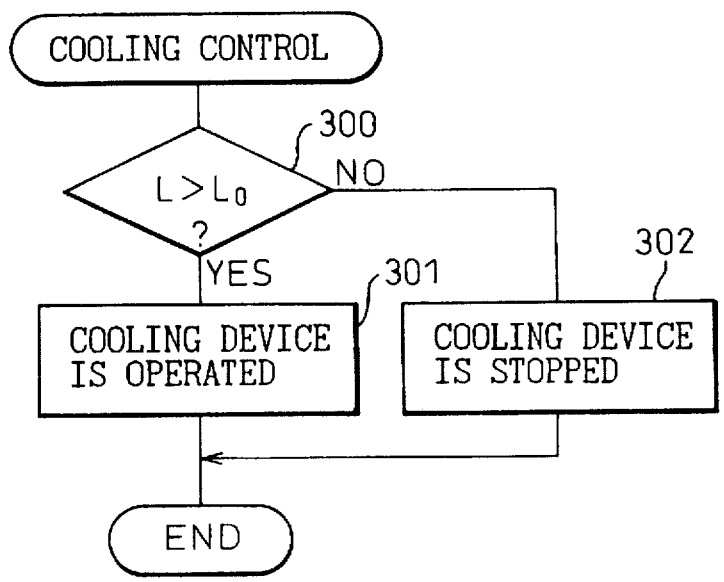
FIG. 22 is a flow chart for the cooling control.

In this embodiment, as shown by the flow chart of FIG. 22, first, at step 300, whether the engine is operating at high load, that is, whether the amount of depression L of the accelerator pedal 30 is larger than a set value L0 or not is judged. When L>L0, step 301 is proceeded to, where the cooler 73 is actuated. At this time the coolant is supplied to the coolant inlet 71 of the cooling device 70 and therefore the intake air is cooled by the cooling device 70. As opposed to this, when L≦L0, step 302 is proceeded to, where the cooler 73 is stopped and therefore the action of cooling the intake air by the cooling device 70 is stopped.

In this way, in this embodiment, at the time of a high load operation where the temperature of the suction gas in the combustion chamber 5 becomes high, the intake air is cooled by the cooling device 70. As a result, the temperature of the suction gas in the combustion chamber 5 is lowered and therefore the generation of soot and $NO_x$ is suppressed. Note that in this embodiment as well, the EGR ratio is made at least 40 percent regardless of the engine load.

Figure 23:
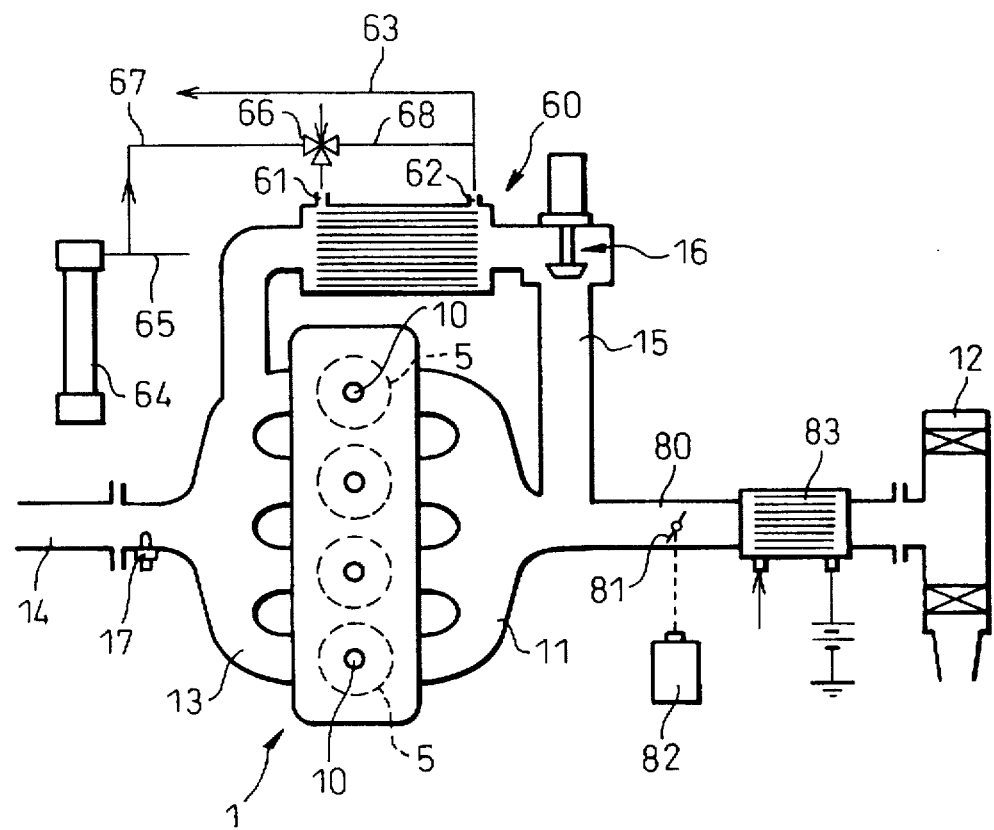
FIG. 23 is an overview of a compression-ignition type engine of still another embodiment.

FIG. 23 shows a fifth embodiment. In this embodiment, recirculation of a large amount of EGR gas is facilitated by the provision of a throttle valve 81 in the intake duct 80 between the intake manifold 11 and air cleaner 12. This throttle valve 81 is controlled to a degree of opening commensurate with the operating state of the engine by a step motor 82. If a throttle valve 81 is provided in this way, however, when the degree of opening of the throttle valve 81 becomes smaller, the pressure in the combustion chamber 5 at the start of the compression stroke falls, so the temperature of the suction gas in the combustion chamber 5 at the end of the compression stroke ends up falling. At the time of an low engine load operation where the amount of heat generated is particularly small, the temperature of the suction gas in the combustion chamber 5 at the end of the compression stroke falls considerably and good combustion can no longer be obtained.

Therefore, in this embodiment, an electrical heater 83 is provided for heating the intake air in the intake duct 80. The electrical heater 83 is made to be actuated when the engine load is low.

Figure 24:
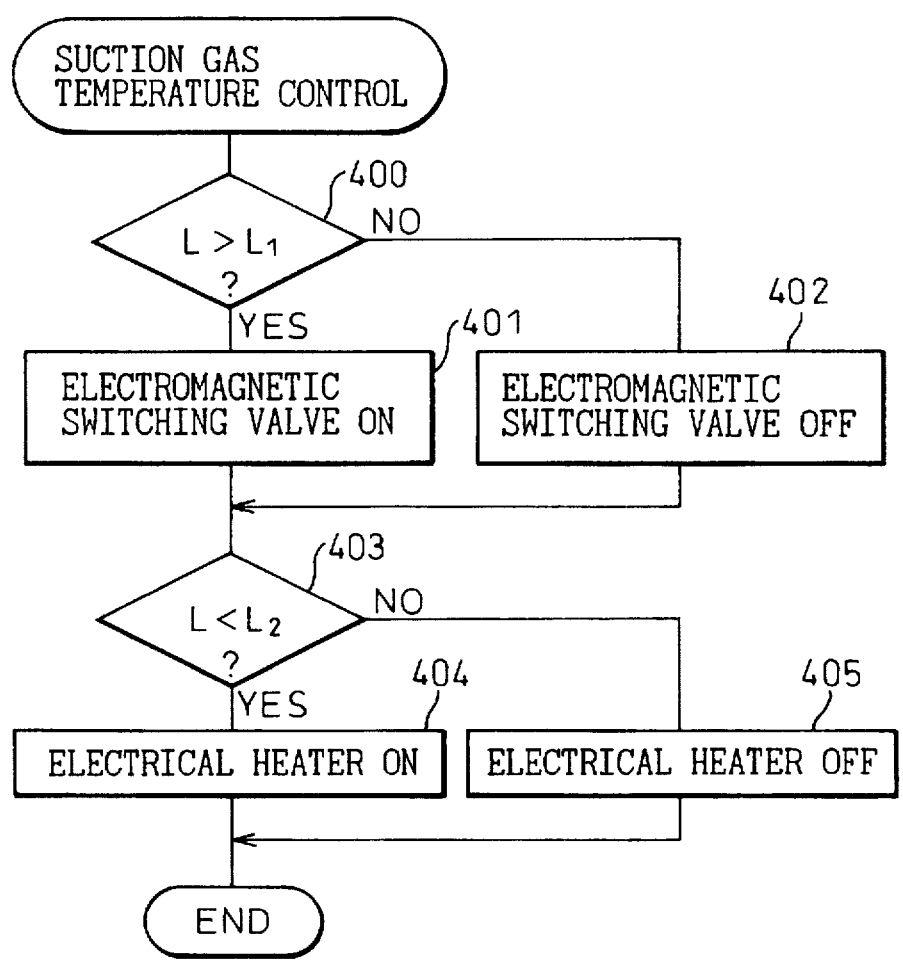
FIG. 24 is a flow chart for the suction gas temperature control.

That is, as shown in the flow chart of FIG. 24, first, at step 400, whether the engine is operating at high load, that is, whether the amount of depression L of the accelerator pedal 301 is larger than a set value L1 or not is judged. When L>L1, step 401 is proceeded to, where the electromagnetic switching valve 66 is turned on. At this time, the cooling water is supplied to the cooling water inlet 61 of the cooling device 60, therefore the EGR gas is cooled by the cooling device 60. As opposed to this, when L≦L1, step 402 is proceeded to, where the electromagnetic switching valve 66 is turned off. At this time, the cooling water is returned through the bypass duct 68 and return duct 63, therefore the action of cooling the EGR gas by the cooling device 60 is stopped.

Next, at step 403, whether the engine is operating at low load, that is, whether the amount of depression L of the accelerator pedal 30 is smaller that a set value L2 (L2<L1) or not is judged. When L<L2, step 404 is proceeded to, where the electrical heater 83 is turned on. As a result, the intake air is heated and therefore the temperature of the suction gas in the combustion chamber 5 at the end of the compression stroke is raised. As opposed to this, when L≧L2, step 405 is proceeded to, where the electrical heater 83 is turned off.

Figure 25:
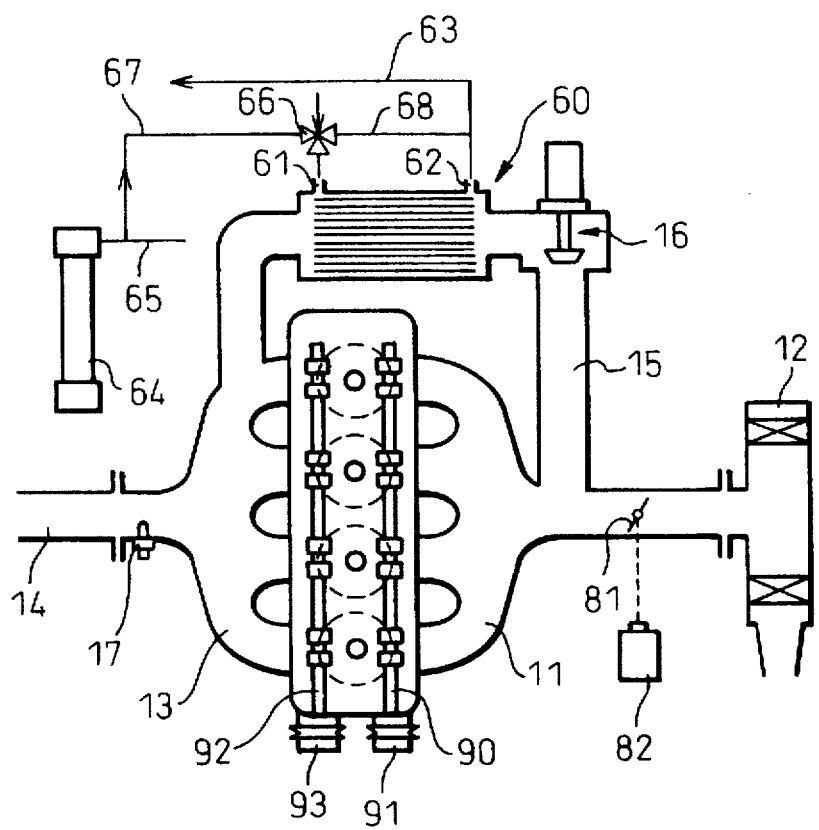
FIG. 25 is an overview of a compression-ignition type engine of still another embodiment.

FIG. 25 shows a sixth embodiment. In this embodiment, the timing of opening of the intake valve 6 or exhaust valve 8 is controlled so as to raise the temperature of the suction gas in the combustion chamber 5 at the end of the compression stroke at the time of low engine load operation. In this embodiment, provision is made of a phase control device 91 of a camshaft 90 for driving the intake valve 6 and a phase control device 93 of a camshaft 92 for driving the exhaust valve 8. These phase control devices 91 and 93 are used to control the timings of opening of the intake valve 6 and the exhaust valve 8.

Figure 26:
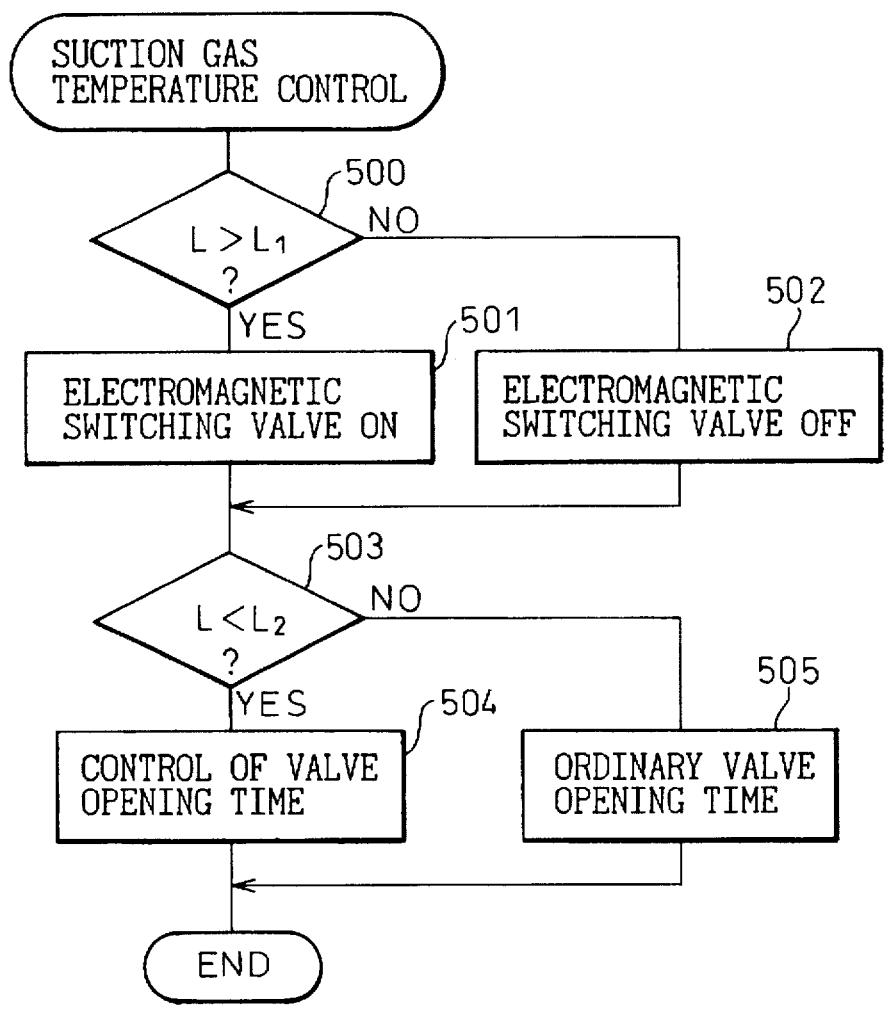
FIG. 26 is a flow chart for the suction gas temperature control.

That is, as shown by the flow chart of FIG. 26, first, at step 500, whether the engine is operating at high load, that is, if the amount of depression L of the accelerator pedal 30 is larger than a set value L1 or not is judged. When L>L1, step 501 is proceeded to, where the electromagnetic switching valve 66 is turned on. At this time, the cooling water is supplied to the cooling water inlet 61 of the cooling device 60 and therefore the EGR gas is cooled by the cooling device 60. As opposed to this, when L≦L1, step 502 is proceeded to, where the electromagnetic switching valve 66 is turned off. At this time, the cooling water is returned through the bypass duct 68 and the return duct 63 and therefore the action of cooling the EGR gas by the cooling device 60 is stopped.

Figure 27A:
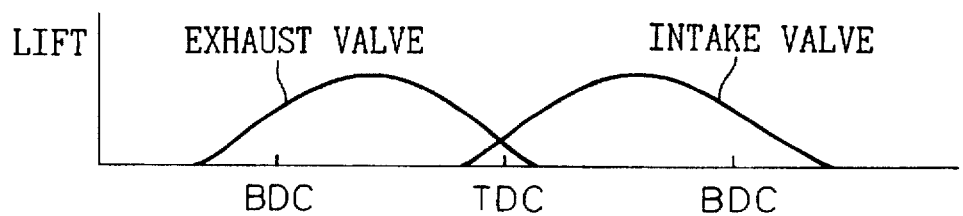
FIGS. 27A, 27B, and 27C are views of lift curves of the intake valves and exhaust valves.

Next, at step 503, whether the engine is operated at low load, that is, whether the amount of depression L of the accelerator pedal 30 is smaller than a set value L2 (L2<L1) or not is judged. When L≧L2, step 505 is proceeded to, where the timings of opening of the intake valve 6 and the exhaust valve 8 are controlled to the normal timings of opening shown in FIG. 27A. As opposed to this, when L<L2, step 504 is proceeded to, where the timings of opening of the intake valve 6 and the exhaust valve 8 are controlled to the timings of opening shown in FIG. 27B or the timings of opening shown in FIG. 27C.

Figure 27B:
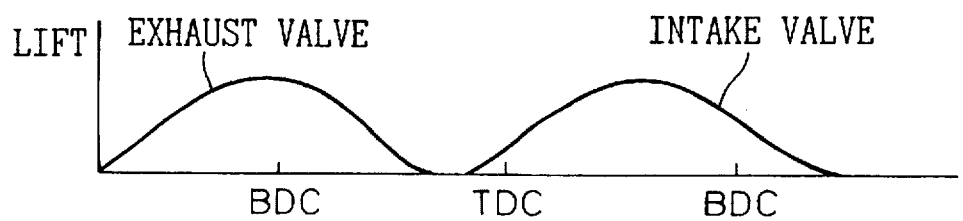

That is, in the case shown in FIG. 27B, the timing of opening of the exhaust valve 8 is advanced. If the timing of opening of the exhaust valve 8 is advanced, the amount of burnt gas remaining in the combustion chamber 5 will increase and therefore the temperature of the suction gas in the combustion chamber 5 will be raised.

Figure 27C:
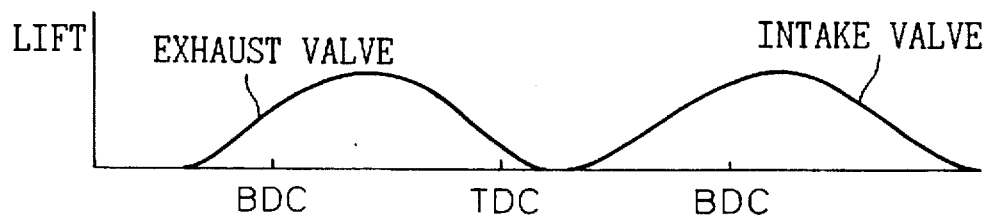

As opposed to this, in the case shown in FIG. 27C, the timing of opening of the intake valve 6 is retarded. If the timing of opening of the intake valve 6 is retarded, the intake air will flow into the combustion chamber 5 rapidly when the intake valve 6 is opened. At this time, the inertial supercharging action of the intake air causes the intake air in the combustion chamber 5 to be adiabatically compressed, so the temperature of the intake gas in the combustion chamber 5 is raised.

Note that it is also possible to control the compression ratio in the combustion chamber 5 to raise the compression ratio in the combustion chamber 5 at the time of low engine load operation.

While the invention has been described by reference to specific embodiments chosen for purposes of illustration, it should be apparent that numerous modifications could be made thereto by those skilled in the art without departing from the basic concept and scope of the invention.

I claim:

1. A compression-ignition type engine having a combustion chamber, an intake passage, and an exhaust passage, said engine comprising:

injection means for injecting fuel in the combustion chamber and forming fuel droplets diffused in the combustion chamber, the mean value of the particle size of said fuel droplets being larger than a predetermined particle size at which the temperature of the fuel droplets having said predetermined particle size reaches a boiling point of a main ingredient of said fuel, which boiling point is determined by pressure in the combustion chamber, at about the top dead center of the compression stroke;

injection time control means for controlling said injection means to carry out an injecting operation by said injection means at a predetermined timing during a period from the start of an intake stroke to approximately 60 degrees before top dead center of the compression stroke;

an exhaust gas recirculation passage interconnecting the exhaust passage to the intake passage; and exhaust gas recirculation control means for controlling an amount of exhaust gas recirculated to the intake passage from the exhaust passage to make an exhaust gas recirculation ratio more than approximately 40 percent at least when the engine is operating under a heavy load.

2. A compression-ignition type engine as set forth in claim 1, wherein said exhaust gas recirculation control means makes the exhaust gas recirculation ratio at least about 40 percent with respect to any engine load.

3. A compression-ignition type engine as set forth in claim 1, wherein air-fuel ratio control means is provided for controlling the air-fuel ratio, said air-fuel ratio control means making the air-fuel ratio substantially the stoichiometric air-fuel ratio at least when the engine is operating under a high load.

4. A compression-ignition type engine as set forth in claim 1, wherein an air-fuel ratio sensor arranged in the exhaust passage is provided, and said exhaust gas recirculation control means controls the amount of exhaust gas recirculation so that the air excess ratio detected by the air-fuel ratio sensor becomes the target air excess ratio.

5. A compression-ignition type engine as set forth in claim 1, wherein the mean particle size of said fuel droplets is more than about 500 µm.

6. A compression-ignition type engine as set forth in claim 1, wherein said injection timing control means makes the injection timing earlier the higher the engine load in accordance with the engine load.

7. A compression-ignition type engine as set forth in claim 1, wherein said injection means is a fuel injector provided in the combustion chamber.

8. A compression-ignition type engine as set forth in claim 1, wherein temperature lowering means is provided for lowering the temperature of the suction gas taken in to the combustion chamber and wherein the temperature of the suction gas is reduced by said temperature lowering means when the engine load is higher than a predetermined load and the action of the temperature lowering means in lowering the temperature of the suction gas is stopped when the engine load is lower than a predetermined load.

9. A compression-ignition type engine as set forth in claim 8, wherein said temperature lowering means is comprised of a cooling apparatus provided in the exhaust gas recirculation passage.

10. A compression-ignition type engine as set forth in claim 8, wherein said temperature lowering means is comprised of a cooling device provided in the intake passage.

11. A compression-ignition type engine as set forth in claim 1, wherein temperature raising means is provided for raising the temperature of the suction gas taken in to the combustion chamber and wherein the temperature of the suction gas is raised by said temperature raising means when the engine load is lower than a predetermined load and the action of the temperature raising means in raising the temperature of the suction gas is stopped when the engine load is higher than a predetermined load.

12. A compression-ignition type engine as set forth in claim 11, wherein said temperature raising means is comprised of an electrical heater provided in the intake passage.

13. A compression-ignition type engine as set forth in claim 11, wherein said temperature raising means is comprised of a camshaft phase control device for controlling the opening time of an exhaust valve and the opening time of the exhaust valve is advanced by said camshaft phase control device when the temperature of the suction gas taken in to the combustion chamber should be raised.

14. A compression-ignition type engine as set forth in claim 11, wherein said temperature raising means is comprised of a camshaft phase control device for controlling the opening time of an intake valve and the opening time of the intake valve is retarded by said camshaft phase control device when the temperature of the suction gas taken in to the combustion chamber should be raised.

15. A compression-ignition type engine as set forth in claim 1, wherein said air-fuel ratio control means controls the air-fuel ratio so that the air excess ratio becomes a target air excess ratio and said exhaust gas recirculation control means controls the amount of exhaust gas recirculation so that the exhaust gas recirculation ratio becomes a target exhaust gas recirculation ratio.

16. A compression-ignition type engine as set forth in claim 15, wherein said target air excess ratio is made substantially 1.0 regardless of the engine load and wherein said target exhaust gas recirculation ratio is made larger the smaller the engine load becomes.

17. A compression-ignition type engine as set forth in claim 15, wherein said target air-fuel ratio is made larger the smaller the engine load becomes and wherein said target exhaust gas recirculation ratio is maintained substantially constant regardless of the engine load.

18. A compression-ignition type engine as set forth in claim 17 wherein said target exhaust gas recirculation ratio is between about 40 percent to 60 percent.

* * * * *